United States Patent [19]

Rogers et al.

[11] Patent Number: 5,582,724
[45] Date of Patent: Dec. 10, 1996

[54] CENTRIFUGE AND ROTOR FOR USE THEREIN

[75] Inventors: Ernest E. Rogers, Pleasant Grove; Kevin E. Collier, Kaysville, both of Utah

[73] Assignee: International Separation Technology, Inc., Salt Lake City, Utah

[21] Appl. No.: 253,960

[22] Filed: Jun. 3, 1994

Related U.S. Application Data

[63] Continuation-in-part of Ser. No. 149,994, Nov. 10, 1993, Pat. No. 5,387,342, which is a continuation-in-part of Ser. No. 896,185, Jun. 10, 1992, Pat. No. 5,464,536.

[51] Int. Cl.$^6$ .......................... B01D 21/26; B01D 17/035
[52] U.S. Cl. .................... 210/221.2; 210/360.1; 210/380.1; 210/512.3; 494/43; 494/60
[58] Field of Search ............................. 210/221.2, 360.1, 210/380.1, 787, 512.1, 512.3; 404/3, 10, 50, 43, 85, 56, 80

[56] References Cited

U.S. PATENT DOCUMENTS

| | | |
|---|---|---|
| 382,966 | 5/1888 | Freitag. |
| 632,616 | 9/1899 | Alfven. |
| 635,488 | 10/1899 | Kneeland. |
| 1,664,769 | 4/1928 | Chance. |
| 1,782,974 | 11/1930 | Rozieres. |
| 2,010,405 | 8/1935 | MacIsaac. |
| 3,288,360 | 11/1966 | Babelay et al.. |
| 3,703,984 | 11/1972 | Pruessner. |
| 3,730,423 | 5/1973 | Coulson. |
| 3,847,327 | 11/1974 | Erikson et al.. |
| 4,199,459 | 4/1980 | Filipowicz et al. ............. 210/325 |
| 4,295,600 | 10/1981 | Saget. |
| 4,525,155 | 6/1985 | Nilsson .......................... 494/10 |
| 4,634,416 | 1/1987 | Ehnstrom ....................... 494/56 |
| 5,045,046 | 9/1991 | Bond ............................... 494/10 |
| 5,116,488 | 5/1992 | Torregrossa ................ 210/221.2 |
| 5,149,432 | 9/1992 | Lavin .......................... 210/360.1 |

FOREIGN PATENT DOCUMENTS

| | | |
|---|---|---|
| 1113184 | 8/1961 | Germany. |
| 1432891 | 9/1969 | Germany. |

*Primary Examiner*—David A. Reifsnyder
*Attorney, Agent, or Firm*—Madson & Metcalf

[57] ABSTRACT

The present invention is directed to a novel rotor design employed in a centrifuge for use in separating fluids. The rotor is configured with a separation chamber which comprises a plurality of channels extending axially and radially throughout the separation chamber. Radial plates extending axially and radially throughout the separation chamber at least partially define the channels. A first and a second weir, each having a front face and a crest extending substantially annularly about the axis of rotation, are also included in the rotor. A fluid outlet passageway is also provided through which the second fluid may exit the separation chamber. The fluid outlet passageway comprises a plurality of channels configured to permit radially inward flow and prevent circumferential flow of the second fluid. These channels are at least partially defined by radial partitions which extend axially and radially within the fluid outlet passageway.

30 Claims, 9 Drawing Sheets

5,582,724

CENTRIFUGE AND ROTOR FOR USE THEREIN

BACKGROUND

1. Related Applications

This application is a continuation-in-part application of U.S. patent application Ser. No. 08/149,994, now U.S. Pat. No. 5,387,342, filed Nov. 10, 1993 and entitled CENTRIFUGAL SEPARATOR AND METHOD, which is a continuation-in-part of U.S. patent application Ser. No. 07/896,185, now U.S. Pat. No. 5,464,536, filed Jun. 10, 1992 and entitled APPARATUS AND METHOD OF CENTRIFUGALLY SEPARATING A FLUID MIXTURE INTO ITS COMPONENT PARTS.

2. The Field of the Invention

The present invention is related to a novel centrifuge used in separating two or more mixed fluid components through centrifugation. More particularly, the present invention is related to an improved rotor design for use in a centrifuge which renders the operation of the centrifuge virtually unaffected by flow rate or fluid composition.

3. Technical Background

Centrifugal systems for fluid separation use centrifugal force generated through rotation to separate fluid components of differing densities. In many fundamental aspects, these systems are used as a substitute for and improvement on gravitational separation techniques and devices, since the gravitational force and the centrifugal force exerted on a fluid through rotation are identical in that they increase in magnitude as the fluid increases in mass. Those fluids with lesser density will be less influenced by the force and therefore less inclined toward the source of the force, the earth for gravitational, the outside of the rotating container for centrifugal, than fluids with greater density. The fluids will thus separate out and can be directed to separate collection ports by using weirs or other suitable separating structures. Centrifugal separation is often more desirable than gravitational because the force applied to the fluid can be controlled through rotation speed and can be made to be many times that of gravity.

A common example of fluid separation is that of oil from water. There are many situations in which separation of these two elements is desired, such as oil spills on an ocean or lake, mixing of the two fluids in a ship's bilge, gasoline spills, etc. The process of fluid separation is often important for maintenance of quality of life in a particular geographic area. These two fluids are susceptible to centrifugal separation because water is more dense than oil and thus will "sink" relative to the other under application of centrifugal force. This can easily be understood by the fact that oil floats on water in a gravitational field. Other fluid separation applications include wine clarification, waste-water treatment, blood plasma separation, and the like. Centrifugation is also used to separate solids out of liquids through sedimentation.

Weir-based centrifugal separators are particularly suited for separating immiscible fluids such as water and oil. Such centrifuges typically include a rotor which is rotated at high angular velocity. The rotor generally includes a separation chamber and at least two weirs—one weir over which the lighter oil may exit the rotor and the other weir over which the heavier therefor water may exit the rotor. The relative radial positioning of the weirs is generally determined based on the density differential of the two fluids being separated.

Centrifugal separators show great promise for quickly and effectively separating immiscible fluids having differing densities. Such separators can effect in seconds what gravity-based separators (settling tanks) take hours to accomplish. However, notwithstanding this promising potential, a significant difficulty encountered with many weir-based centrifugal separators is that their flow capacity is limited.

The use of annular weirs and separation chambers, as disclosed in the previously filed, related applications, permits flow rate through those portions of the centrifuge to be maximized. Such designs, although believed to permit maximum flow rates, performed at significantly lower flow rates than those analytically predicted.

Thus, it would be a significant advancement in the art to produce a centrifuge design which would permit the efficient separation of fluids at substantially higher flow rates than those achievable by presently available designs.

Such a device is disclosed and claimed herein.

BRIEF SUMMARY AND OBJECTS OF THE INVENTION

The present invention is directed to a novel rotor design employed in a centrifuge for separating into its component parts a mixture of a first fluid and a second fluid, the first fluid having a density less than the density of the second fluid.

Separation is accomplished due to differences in density of the components of the fluid. In the centrifuge, the lighter, or lower-density, components "float" toward the axis of rotation and away from the centrifugal force, and the heavier, or more dense, portions migrate in the direction of the force.

The force, dF, on a differential element of fluid in the separator can be expressed by the following formula:

$$dF = \rho \omega^2 r \, dV \qquad (1)$$

where $\rho$ is the density of the fluid, $\omega$ is the angular velocity, and $r$ is the radial distance from the axis of rotation to the differential element of fluid. Similarly, the pressure differential, dP, across the element is:

$$dP = \rho \omega^2 r \, dr \qquad (2)$$

and the pressure at a particular radial location in the fluid is obtained by integration:

$$P(r) = P_S + \int_{r_S}^{r} \rho \omega^2 r \, dr \qquad (3)$$

where $P_S$ is the pressure acting on the surface of the fluid and $r_S$ is the radial distance from the axis of rotation to the surface of the fluid.

In these equations, additional terms related to friction or nonrotational motion of the fluid within the separator have been neglected and are usually small. The pressure within the fluid as expressed by equation 3 is a conservative field and is independent of the path of integration. In general, omega, the angular velocity of the fluid element, is a function of position within the fluid. Only in the case that omega is constrained to a simple functional relationship, such as a constant, can the integration be readily performed.

In many centrifuges designed for industrial processes, inlet and outlet connections are provided so that the fluid to be separated can be processed continuously, the separated components being discharged through separate ports or conduits. Customarily the inlet and outlet ports of the rotor are placed close to the axis of rotation to facilitate construction and operation.

In many continuous-flow centrifuges or separators, a particular difficulty associated with their application is the need to assure that each separate component is discharged through its appropriate port with minimal contamination from other components. To achieve this, the boundary between fluid components must not approach too closely either outlet of the separation chamber; therefore, it is generally desired to maintain the boundary at a position that is midway between the separation chamber outlets.

The difficulty in achieving this condition can be more clearly understood by reference to the equations cited above. Because the pressure within the fluid is a conservative field, the pressure at the fluid boundary can be obtained in principle by integration along a path through either liquid component, where the surface pressure, $P_S$, represents the gas pressure over the appropriate component. In operation, the fluid boundary will assume the appropriate position so that the pressure obtained by integrating through either liquid component is the same.

Rotors are generally constructed such that fluid must flow radially inward and outward as it passes through the rotor. The velocity of this radial flow is dependent on the total flow rate of fluid through the separator and on the relative proportions of the components; that is, the radial velocity of each fluid component is related to the volume flow rate of that component.

Radial motion in a rotating system gives rise to angular accelerations, referred to as Coriolis effects. This occurs because of the natural tendency of a body to conserve momentum. The consequence of these effects in most prior-art centrifuges is that the angular velocity of the fluid in the separator varies according to the variations in radial velocity. This variance increases in severity as the flow rate increases. If angular velocity varies for different radial elements of the fluid, the flow field is vastly further complicated by momentum transfer between the shearing elements—the rate of transfer depending on viscosity. The general effect for separators in the prior art is an observed degradation of performance at high flow rates.

The practical consequence is that the performance of a centrifuge depends in a complex way on the flow rate, and proportions, densities, and viscosities of the fluids to be separated. Generally, some adjustment is usually provided in the separator design to maintain the boundary within the desired range, and any change in operating conditions necessitates an adjustment, often involving complex mechanisms and sensing schemes, or requires time-consuming, trial-and-error adjustments to be made. Since so many variables are at play in the operation of a continuous-flow centrifuge, considerable difficulty is often experienced in maintaining satisfactory performance if any operating parameters are subject to change.

The present invention includes a novel rotor design in which the fluid in the rotor is forced to move at the same angular velocity as the rotor. This is accomplished by dividing the annuli within the rotor in which there is radial fluid flow into a plurality of divisions, or channels. The divisions cause the flow through the rotor to have substantially constant angular velocity equal to that of the rotor—the preferred operating condition for eliminating Coriolis effects.

In one embodiment, the centrifuge includes an inlet duct having a receiving end and a discharge end. A rotor is provided in fluid communication with the discharge end of the inlet duct and is disposed for rotation about an axis of rotation. A motor or other means for rotating the rotor is also provided.

The rotor is configured with a separation chamber which comprises a plurality of channels extending axially and radially throughout the separation chamber. The separation chamber includes radial plates extending axially and radially which at least partially define these channels.

The rotor is further configured with a first and a second weir, each having a front face and a crest extending substantially annularly about the axis of rotation. The front face of the first weir defines a portion of the separation chamber. The radial plates extend along substantially the entire front face of the first weir.

The rotor further includes an inlet passageway through which the fluid mixture may enter the separation chamber and a first fluid outlet passageway through which the first fluid may exit the separation chamber. A second fluid outlet passageway is also provided through which the second fluid may exit the separation chamber. The second fluid outlet passageway includes an inlet end and an exit end, with the exit end being at least partially defined by the crest of the second weir.

The second fluid outlet passageway comprises a plurality of channels configured to permit radially inward flow and prevent circumferential flow of the second fluid. These channels extend substantially the entire distance from the inlet end to the exit end of the second fluid outlet passageway along a substantially constant axial position and are at least partially defined by radial partitions which extend axially and radially within the second fluid outlet passageway.

In an alternative embodiment, the rotor includes a hub which is disposed at the axis of rotation. The rotor is further configured with a separation chamber and a first and a second weir which extend substantially annularly about the axis of rotation and which are disposed in fluid communication with the separation chamber.

The rotor further comprises a plurality of partitions which extend radially and axially. These partitions define individual cells which each include a channel which defines an individual flow path for fluid through the separation chamber and over one of the weirs.

This alternative embodiment also includes radial plates extending radially and axially within the separation chamber, thereby narrowing the flow channels through the separation chamber by defining additional channels.

In another embodiment of the present invention, a centrifuge is provided which includes an inlet duct configured with a receiving end and a discharge end. The centrifuge also includes a separation chamber mounted for rotation about an axis of rotation. The separation chamber includes an inlet passageway, a first fluid outlet passageway, and a second fluid outlet passageway, with the inlet passageway being positioned in fluid communication with the discharge end of the inlet duct for receiving the fluid mixture from the inlet duct. The separation chamber also comprises a plurality of channels extending axially and radially. The channels are at least partially defined by a plurality of radial plates extending axially and radially within the separation chamber.

The second fluid outlet passageway extends generally toward the axis of rotation and includes an inlet end and an exit end. The second fluid outlet passageway further comprises a plurality of channels configured to permit radially inward flow and prevent circumferential flow of the second fluid. The channels of the second fluid outlet passageway are at least partially defined by a plurality of radial partitions which extend axially and radially within the second fluid outlet passageway and extend substantially the entire distance from the inlet end to the exit end of the second fluid outlet passageway.

A first weir is positioned in fluid communication with the first outlet passageway of the separation chamber. The first weir is configured with a crest over which the first fluid may pass and is positioned relative to the second fluid outlet passageway such that the inlet end of the second fluid outlet passageway is positioned at a location radially outward from the crest of the first weir.

The centrifuge is further configured with a second weir having a crest over which the second fluid may pass to exit the second fluid outlet passageway. The exit end of the second fluid outlet passageway is at least partially defined by the crest of the second weir.

The centrifuge includes a fluid pressure chamber which is positioned radially outward from the crest of the second weir. The fluid pressure chamber receives the second fluid as it exits the second fluid outlet passageway over the second weir.

The fluid pressure chamber is partially defined by an exit weir having a crest over which the second fluid may pass to exit the fluid pressure chamber. An annular plate is disposed to define a portion of the fluid pressure chamber. The fluid pressure chamber has a first end which is at least partially defined by the edge of the annular plate and a second end at least partially defined by the crest of the exit weir.

Importantly, the fluid pressure chamber also comprises a plurality of channels configured to permit radial flow and prevent circumferential flow of the second fluid through the fluid pressure chamber. The channels of the fluid pressure chamber are at least partially defined by a plurality of partitions extending axially and radially within the fluid pressure chamber from the first end to the second end of the fluid pressure chamber.

A gas chamber is positioned in fluid communication with the exit end of the second fluid outlet passageway and extends radially outward to the fluid pressure chamber. Gas may be introduced into the gas chamber through a gas introduction passageway.

Thus, it is an object of the present invention to provide a centrifuge which permits the efficient separation of fluids at substantially higher flow rates than those achievable by presently available designs.

These and other objects and advantages of the present invention will become more fully apparent by examination of the following description of the preferred embodiments and the accompanying drawings.

BRIEF DESCRIPTION OF THE DRAWINGS

In order that the manner in which the above-recited and other advantages and objects of the invention are obtained may be understood, a more particular description of the invention briefly described above will be rendered by reference to the appended drawings. Understanding that these drawings only provide information concerning typical embodiments of the invention and are not therefore to be considered limiting of its scope, the invention will be described and explained with additional specificity and detail through the use of the accompanying drawings, in which.

DETAILED DESCRIPTION OF THE PREFERRED EMBODIMENTS

Figure 1:
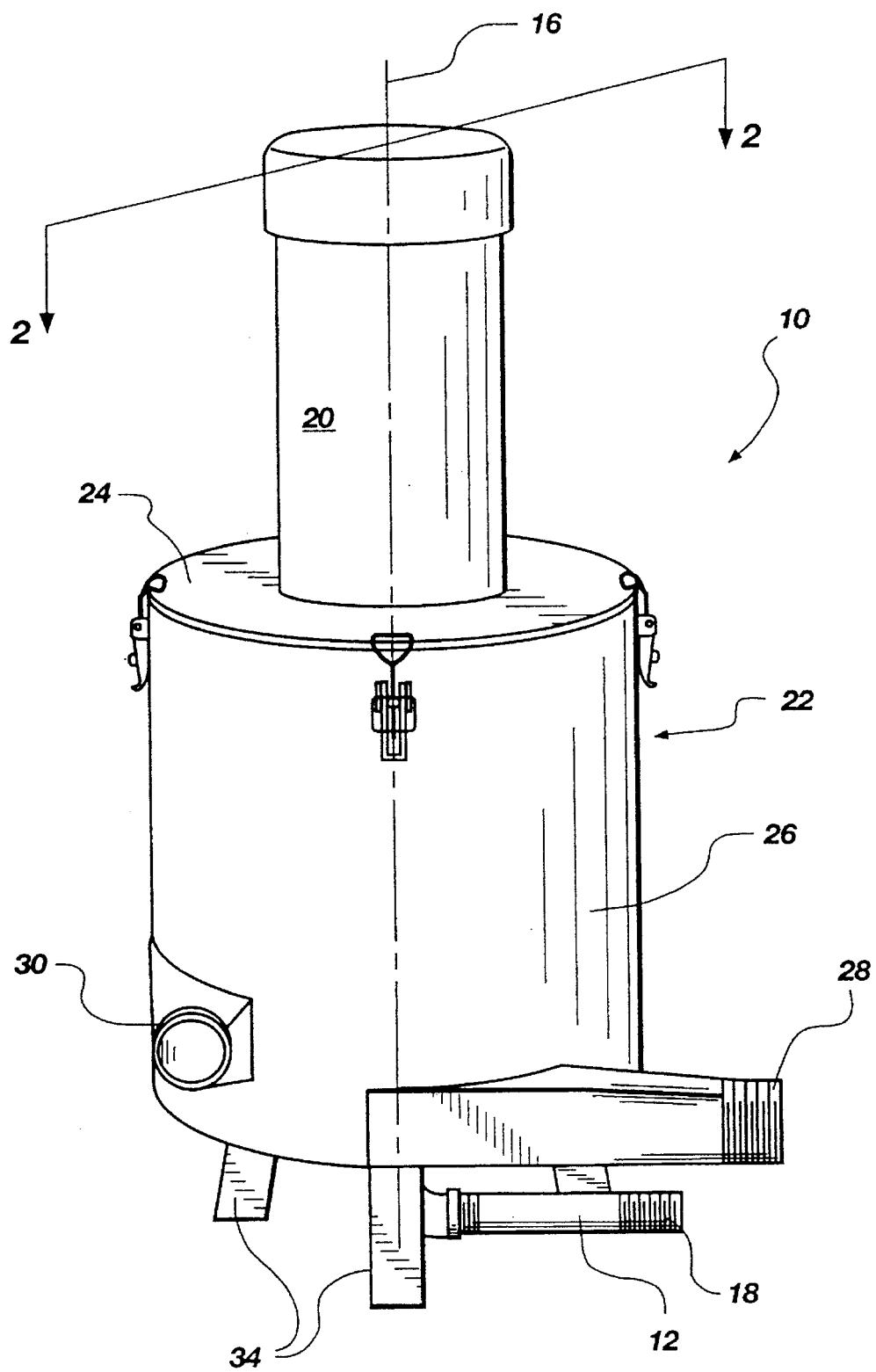
FIG. 1 is a perspective view of one presently preferred embodiment of a centrifuge in which the teachings of the present invention have been incorporated.

Reference is now made to the figures wherein like parts are referred to by like numerals throughout. With particular reference to FIG. 1, a centrifuge according to the present invention is generally designated at 10. The centrifuge 10 of the present invention may be successfully utilized in separating a variety of fluids having differing densities or viscosities. For ease of illustration, however, the embodiments of the invention discussed herein will be described with reference to the separation of oil and water, it being understood that the centrifuge may be utilized to separate a variety of fluids.

The centrifuge 10 includes an inlet duct 12 through which a fluid mixture may enter the centrifuge 10. Means for introducing a fluid into the inlet duct 12, such as a pump (not shown), may also be provided. The inlet duct 12 is in fluid communication with a rotor 14 (FIG. 2) which is mounted for rotation about an axis of rotation 16. The receiving end of the inlet duct 12 is also configured with threads 18 by which the inlet duct may be connected to a supply line.

A motor 20 is provided to rotate the rotor 14. Although the centrifuge of the present invention could be manufactured in a variety of sizes, this preferred embodiment is designed to process approximately 50 liters/minute. In such an embodiment it is presently preferred to utilize a 2.5 horsepower, 3440 rpm electric motor.

The rotor is housed by housing 22 which includes a top plate 24 upon which the motor 20 is mounted. The top plate 24 is attached to a side wall 26 of the housing with latches, or by other removable means, thereby permitting the top plate 24 to be easily removed to facilitate manufacture and maintenance of the centrifuge 10.

The side wall 26 of the housing 22 is configured with an oil exit duct 28 and a water exit duct 30 through which the oil and water, respectively, may exit the centrifuge 10. The oil and water exit ducts 28, 30 are aligned tangentially to the housing 22 to facilitate the removal of separated fluids from the centrifuge. The ends of the oil exit duct 28 and the water exit duct 30 are each threaded so that pipes or hoses may be readily attached to them to channel the separated water and oil exiting the centrifuge.

The housing 22 is further configured with a bottom plate 32 (FIG. 2), thereby completely enclosing the rotor 14. Although a variety of materials may be utilized in the manufacture of the housing, it is presently preferred to use aluminum or stainless steel. Four legs 34 are provided to support the centrifuge. Legs 34 may be configured with means for rigidly mounting the centrifuge.

Figure 2:
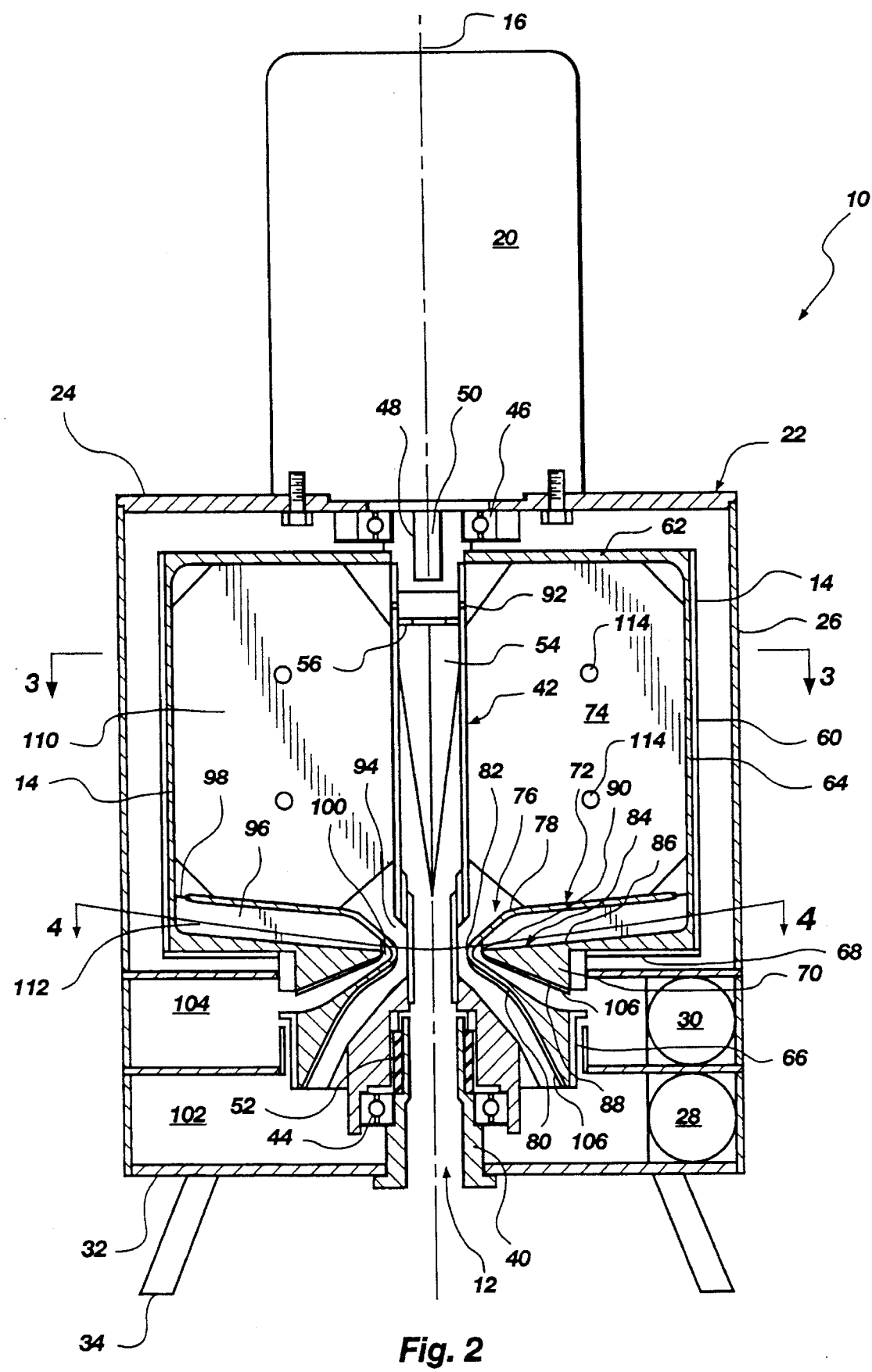
FIG. 2 is a cross-sectional view taken along line 2—2 of FIG. 1.

With reference now to FIG. 2, the inlet duct 12 comprises a stationary shaft 40 mounted to the bottom plate 32 of the housing 22. The inlet duct 12 extends into the rotor 14 and is defined therein by a hub 42 which extends along the axis of rotation 16 within the rotor 14. A lower bearing 44 and an upper bearing 46 are provided for rotatably mounting the hub 42.

The hub 42 is configured with a keyed hole 48 into which the drive shaft 50 of the motor is engaged. The lower end of the hub 42 is enlarged to extend over the lower bearing 44. A seal 52 is provided to seal the stationary shaft 40 to the hub 42, thereby preventing any fluid leakage as the fluid enters the centrifuge 10.

Within the hub 42 is disposed a fluid accelerator 54 comprised of four orthogonal plates which extend from the top of the inlet duct 12 and converge to a point within the approximate center of the hub 42. A ring 56 is positioned at the top of the accelerator 54.

The rotor 14 includes a shell 60 which extends along the periphery of the rotor 14. The shell 60 includes a top portion 62, an upper side portion 64, a lower side portion 66 and a bottom portion 68. An annular wedge 70 extends radially inwardly from the upper side portion 64 of the shell 60. The rotor 14 further includes an annular wall 72 which extends radially inwardly from the lower side portion 66, between the annular wedge 70 and the hub 42, and radially outward to a point near the shell 60.

A separation chamber 74 is thus defined by the top portion 62 and upper side portion 64 of the shell 60, the hub 42 and the upper portion of the annular wall 72. The radially inward portion of the annular wall 72 defines a first weir 76 over which the oil may pass to exit the separation chamber 74. The first, or oil, weir 76 includes a front face 78, a back face 80 and a substantially sharp crest 82 which extends annularly about the axis of rotation 16. Likewise, the radially inward portion of the annular wedge 70 defines a second, or water, weir 84, over which the water may pass. The second weir 84 includes a front face 86, a back face 88 and a substantially sharp crest 90 extending annularly about the axis of rotation 16.

The rotor 14 also includes an inlet passageway through which the fluid mixture may enter the separation chamber. The inlet passageway comprises a plurality of inlet holes 92 configured in the hub 42. The rotor is also configured with a first fluid, or oil, outlet passageway 94 through which the first fluid may exit the separation chamber. Likewise, a second fluid, or water, outlet passageway 96 through which the second fluid may exit the separation chamber 74 is defined between the upper portion of the annular wall 72 and the front face 86 of the water weir 84.

The water outlet passageway 96 includes an inlet end 98 and an exit end 100. Exit end 100 is at least partially defined by the crest 90 of the water weir 84.

An oil exit passageway 102 is provided along the back face 80 of the oil weir 76 through which oil may exit the rotor 14 and enter the oil exit duct 28. A water exit passageway 104 is similarly provided, partially defined by the back face 88 of the water weir 84, through which the water may exit the rotor 14 and be discharged from the centrifuge through water exit duct 30.

The back faces 80, 88 of the weirs 76, 84 are configured with a plurality of ribs 106 which extend along the lower portions of the back faces of the weirs. The ribs 106 extend outwardly from the back faces of the weirs in a direction approximately normal to the surface of the back faces and with a height approximately equal to the height of flow of fluid along that face.

Figure 3:
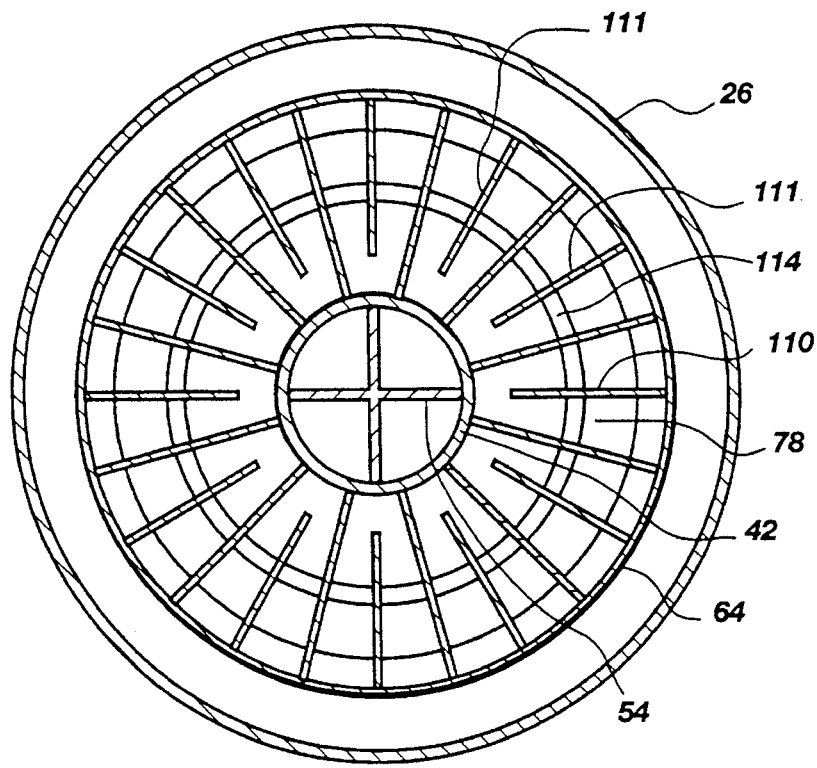
FIG. 3 is a cross-sectional view taken along line 3—3 of FIG. 2.

As illustrated in FIG. 3, the separation chamber 74 further includes a plurality of uniformly spaced radial plates 110. The radial plates 110 define a plurality of radially oriented channels within the separation chamber. As illustrated in FIG. 2, the radial plates 110 extend along substantially the entire front face 78 of the oil weir 76. Thus, the radial plates span substantially the entire radial and axial extent of the separation chamber 74. In one preferred embodiment, 36 plates 110 are employed within the separation chamber 74. It is preferred that the number of plates 110 be selected such that the Reynolds number of the flow through the separation chamber will be less than the critical Reynolds number, thereby constraining the flow to be laminar. In one preferred embodiment, every other plate comprises a short plate 111 which does not extend entirely to the hub 42. The plates 110 are configured with spacers 114 positioned between adjacent plates 110 to ensure that uniform spacing between plates 110 is maintained.

Although a variety of materials may be employed, the plates 110 are preferably made of a material having an affinity for one of the fluids to be separated in the separator. In this embodiment which is intended for use in removing oil from water, it is preferred that the plates be made of a lipophilic material such as polypropylene or polyurethane.

Figure 4:
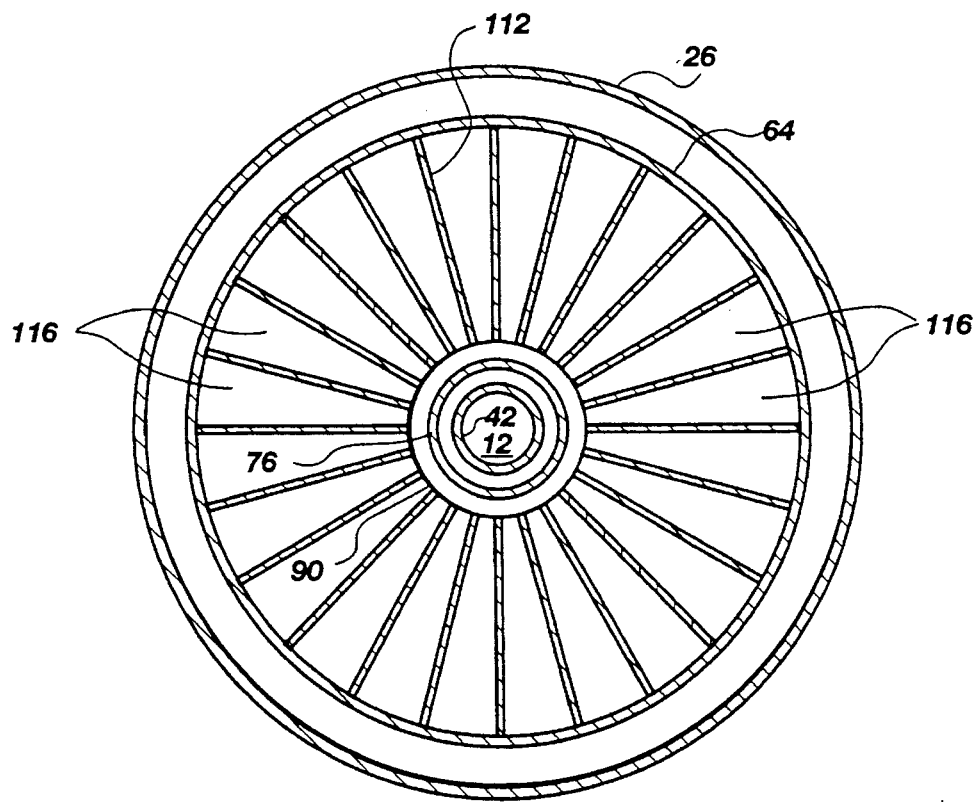
FIG. 4 is a cross-sectional view taken along line 4—4 of FIG. 2.

With reference now to FIG. 4, the second fluid outlet passageway 96 also includes radial partitions 112 which define a plurality of channels configured to permit radially inward flow of the water. In this embodiment of the invention, the partitions 112 extend from the crest 90 of the water weir 84 to the side portion of the shell 60, as illustrated in FIG. 2. Thus, the radial flow channels 116 defined within the second fluid outlet passageway 96 extend substantially the entire distance from the inlet end 98 to the exit end 100 of the second fluid outlet passageway 96. In a presently preferred embodiment, 18 partitions 112 are employed in the second fluid outlet passageway 96.

As illustrated in FIG. 4, the channels 116 of the second fluid outlet passageway extend towards the axis of rotation and are positioned at a substantially constant circumferential and axial position. In other embodiments, however, it may be preferable to configure the second fluid outlet passageway at an angle with respect to the radial direction, thereby providing flow through the second fluid outlet passageway in both the axial and radial directions.

Figure 5:
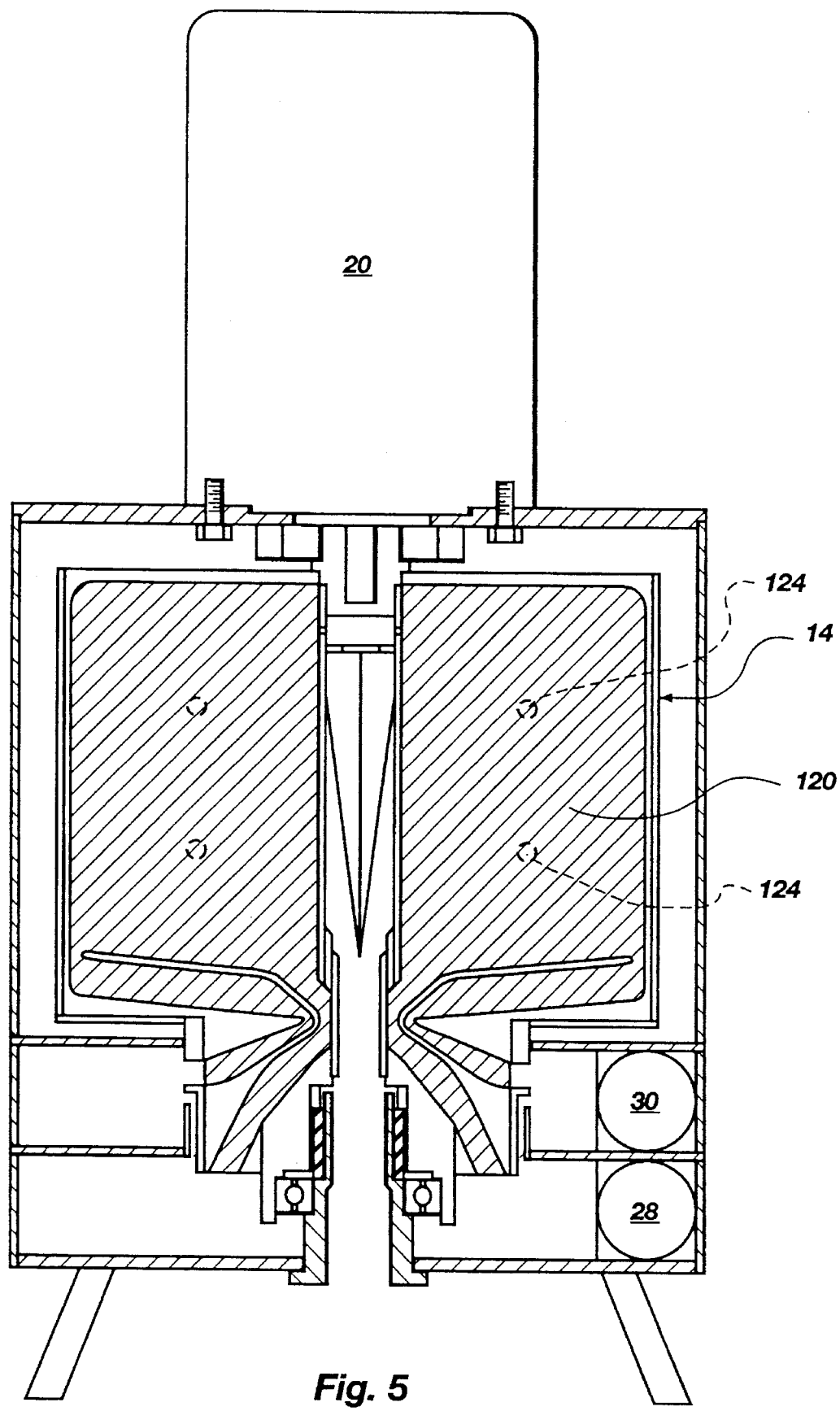
FIG. 5 is a cross-sectional view, similar to that illustrated in FIG. 2, of an alternative embodiment of a centrifuge built according to the teachings of the present invention.

In another preferred embodiment, the rotor 14 is configured with a plurality of radially positioned partitions 120 extending through the entire rotor 14, as illustrated in FIG. 5. The partitions 120 thus define individual cells, each cell including a channel which defines an individual flow path for fluid through the separation chamber and over one of the weirs. In this embodiment, the partitions are preferably imperforate, thereby preventing fluid from passing from one cell to an adjacent cell. In a preferred embodiment, spacers 124 are employed to connect adjacent partitions 120. In the embodiment illustrated in FIG. 5, it is presently preferred to employ 18 partitions 120 extending through the entire rotor 14. For some applications, it may also be preferable to include additional partitions within the separation chamber 74 which do not fully extend to the hub, resulting in a configuration similar to that illustrated in FIG. 3, thereby narrowing the flow channels through the separation chamber by defining additional channels. In such an embodiment, 36 partitions would be utilized within the separation chamber.

The rotor 14 according to this embodiment of the invention may be made of plastic or metal. Preferably, however, the partitions 120 are made of a lipophilic material, thereby assisting in the separation of finely dispersed or emulsified oil.

Figure 6:
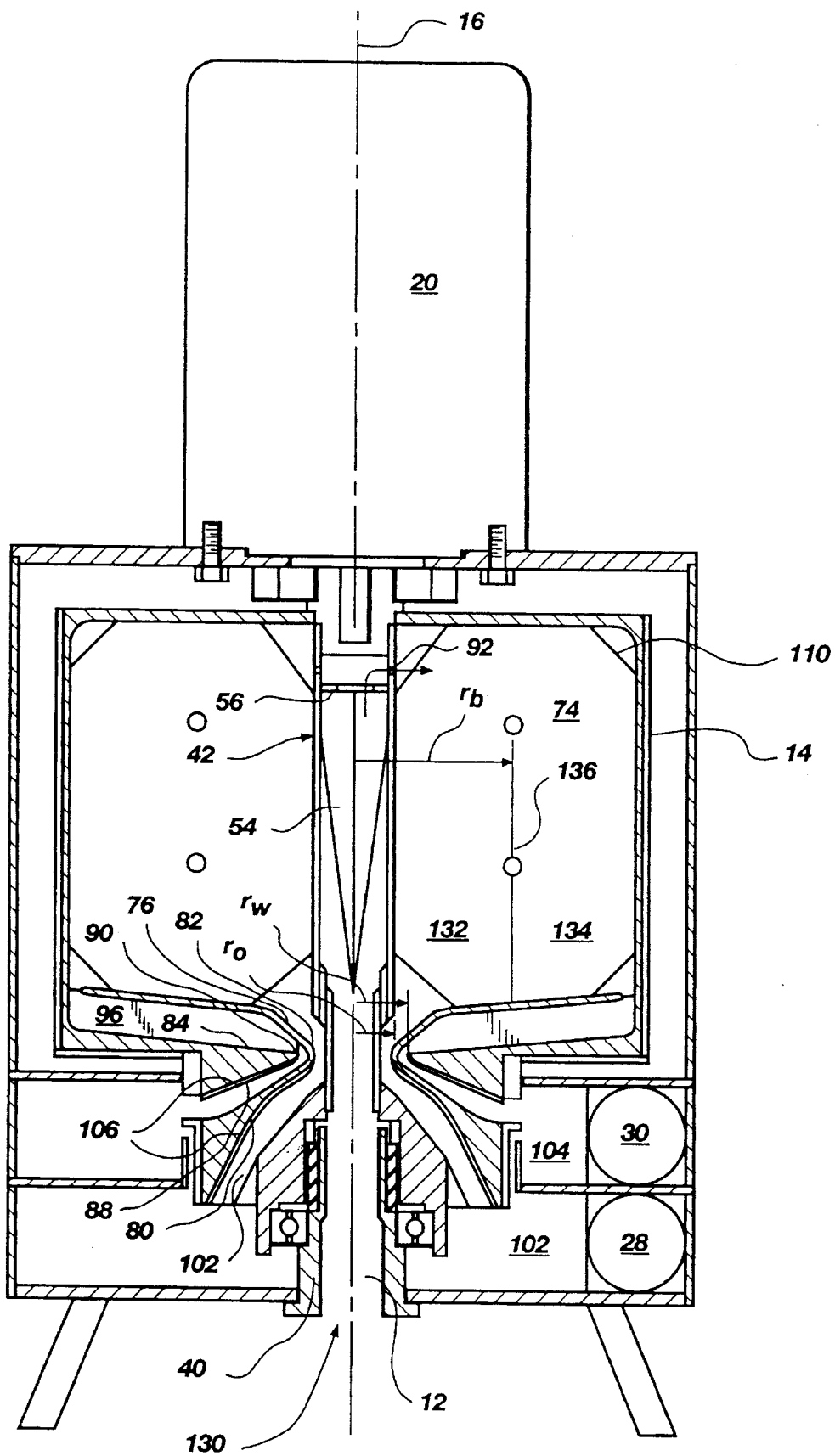
FIG. 6 provides the same view as FIG. 2 and illustrates the centrifuge in operation.

The operation of the centrifuge is best explained with reference to FIG. 6. In operation, with the motor 20 rotating the rotor 14, a water/oil mixture 130 is introduced into the centrifuge through inlet duct 12. In this embodiment which is designed to process a maximum of approximately 50 liters/minute, it is presently preferred to rotate the rotor at approximately 3500 revolutions per minute.

The fluid mixture 130 travels through the stationary shaft 40 and into the hub 42. Once the fluid mixture enters the hub 42, it begins to gain the rotational velocity of the rotor 14. Angular acceleration of the fluid is promoted by the fluid accelerator 54 disposed within the hub 42.

As the fluid mixture 130 reaches the upper portion of the hub 42, it passes through the ring 56. Ring 56 acts as a weir, preventing sediment within the fluid mixture 56 from passing through the centrifuge. After passing through the ring 56, the fluid mixture enters the separation chamber 74 by passing through inlet holes 92.

Upon entering the separation chamber 74, the fluid is disposed within the channels defined by adjacent plates 110 (or partitions 120, FIG. 5). Constraining the fluid to flow through the channels ensures that the angular velocity of the fluid substantially matches that of the rotor. Within the separation chamber 74, the fluid mixture 130 is subjected to the substantial g-forces imposed due to the rotation of the rotor 14. Consequently, the fluid mixture 130 separates into its constituent parts—the lower density oil 132 quickly migrates to the radially inward portion of the separation chamber while the water 134, having a greater density than that of the oil 132, accumulates radially outward of the oil. Consequently, an annular oil/water boundary 136 forms within the separation chamber and extends substantially vertically.

The oil 132 exits the separation chamber by passing over the crest 82 of the oil weir 76 while the water 134 passes through the water outlet passageway 96 and over the crest 90 of the water weir 84. After passing over the crest of the oil weir 76, the oil 132 is propelled along the back face 80 of the oil weir 76. The ribs 106 ensure that the oil 132 maintains the angular velocity of the rotor 14 as it travels down the back face of the oil weir. Thus, the height of the ribs should be at least equal to the depth of the oil on the back face of the oil weir during operation at maximum flow rate.

Upon its release from the back face 80 of the oil weir 76, the oil 132 is propelled at a substantial tangential velocity through the oil exit passageway 102. Because of the significant linear velocity imposed on the oil by the rotor 14, the oil readily flows around the oil exit passageway 102 until it reaches the oil exit duct 28 at which point it is permitted to follow its natural path (tangential to the circular oil exit passageway 102) and exit the centrifuge.

The water 134 exits the separation chamber by passing through the water outlet passageway 96 and over the crest 90 of the water weir 84. As the water passes through the water outlet passageway, it flows through the channels which are partially defined by the partitions within the water outlet passageway. Thus, the flow of water through the water outlet passageway 96 is constrained to have substantially the same angular velocity as the rotor.

After passing over the crest 90 of the water weir 84, the water passes along the back face 88 of the water weir 84, with the ribs 106 ensuring that the water maintains the angular velocity of the rotor 14. As the water travels off the back face 88 of the water weir 84, it is traveling with substantial linear velocity. Thus, the water 134 readily flows through the water exit passageway 104 until it reaches the water exit duct 30 at which point it exits the centrifuge.

Importantly, the fluid passing over the crest 82 of the oil weir 76 and the fluid passing over the crest 90 of the water weir 84 each have an air boundary "above" (radially inward) the crest of the weir over which they are passing. In this embodiment, these two locations are in fluid communication with each other and are generally maintained at the same air pressure.

The importance of the use of radial channels within the separation chamber 74 and in the water outlet passageway 96 can be realized by analyzing the formula which governs the pressure balance of fluid within the rotor 14. As shown previously, the pressures exerted on opposite sides of the fluid boundary 136 are equal. This condition is expressed in the following pressure balance equation:

$$P_O + \int_{r_O}^{r_b} \rho_O \omega^2 r \, dr = P_W + \int_{r_W}^{r_b} \rho_W \omega^2 r \, dr \qquad (4)$$

where $P_O$ is the gas pressure over the oil weir, $P_W$ is the gas pressure over the water weir, $r_O$ is the radial distance from the axis of rotation 16 to the surface of the oil as it approaches the crest 82 of the oil weir 76, $r_b$ is the radial distance from the axis of rotation 16 to the fluid boundary 136 within the separation chamber 74, $r_W$ is the distance from the axis of rotation 16 to the surface of the water as it approaches the crest 90 of the water weir 84, $\rho_O$ is the effective density of the oil 132, $\rho_W$ is the effective density of the water 134, and $\omega$ is the angular velocity of the water and oil as they pass through the rotor 14.

In this embodiment, $P_O$ and $P_W$ are substantially equal. One of skill in the art will realize that other embodiments may utilize means of controlling these pressures and in such embodiments $P_O$ and $P_W$ may not be equal.

Preferably, the angular velocity of the fluids should be equal to the velocity of rotation of the rotor and should remain constant as the fluids pass through the rotor. If this condition is satisfied, then $\omega$ cancels out of the above equation; thus, the operation of the separator is essentially unaffected by flow rate or fluid composition—a substantial benefit of the present invention.

Constant fluid angular velocity throughout the rotor has not been achieved in prior-art centrifuges because as the fluids move through the separator, they will conserve momentum in the absence of applied forces. That is, $\omega r$ remains constant for an element of fluid as it moves through the rotor. Thus, if an element of fluid moves radially inwardly, r decreases. Consequently, $\omega$ increases an appropriate amount to keep $\omega r$ constant.

Without the use of radial plates 110 within the separation chamber 74 and without the use of the radial partitions 112 in the water outlet passageway 96 (that is, if the separation chamber and the water outlet passageway were open, annular chambers), the fluid would "swirl" about the axis of rotation wherever it changed radial position. For example, for a rotor with an open separation chamber and water outlet passageway, as the flow moves radially inward toward the crest of one of the weirs, the angular velocity of the flow increases, causing the angular velocity of the fluid to be higher than that of the rotor. The resulting relative velocity of the fluid with respect to the rotor is the measure of this swirling effect.

As recognized by the present invention, the swirling which results from the natural tendency of the fluid to conserve momentum can be substantially prevented by dividing the separation chamber and the water outlet passageway into a plurality of channels, such as by interspersing plates or partitions extending axially and radially within those volumes. It has been found that dividing those annuli into angular divisions, or channels, renders flow which conforms sufficiently to the preferred condition of having fluid angular velocity which is constant throughout the rotor 14.

Figure 7:
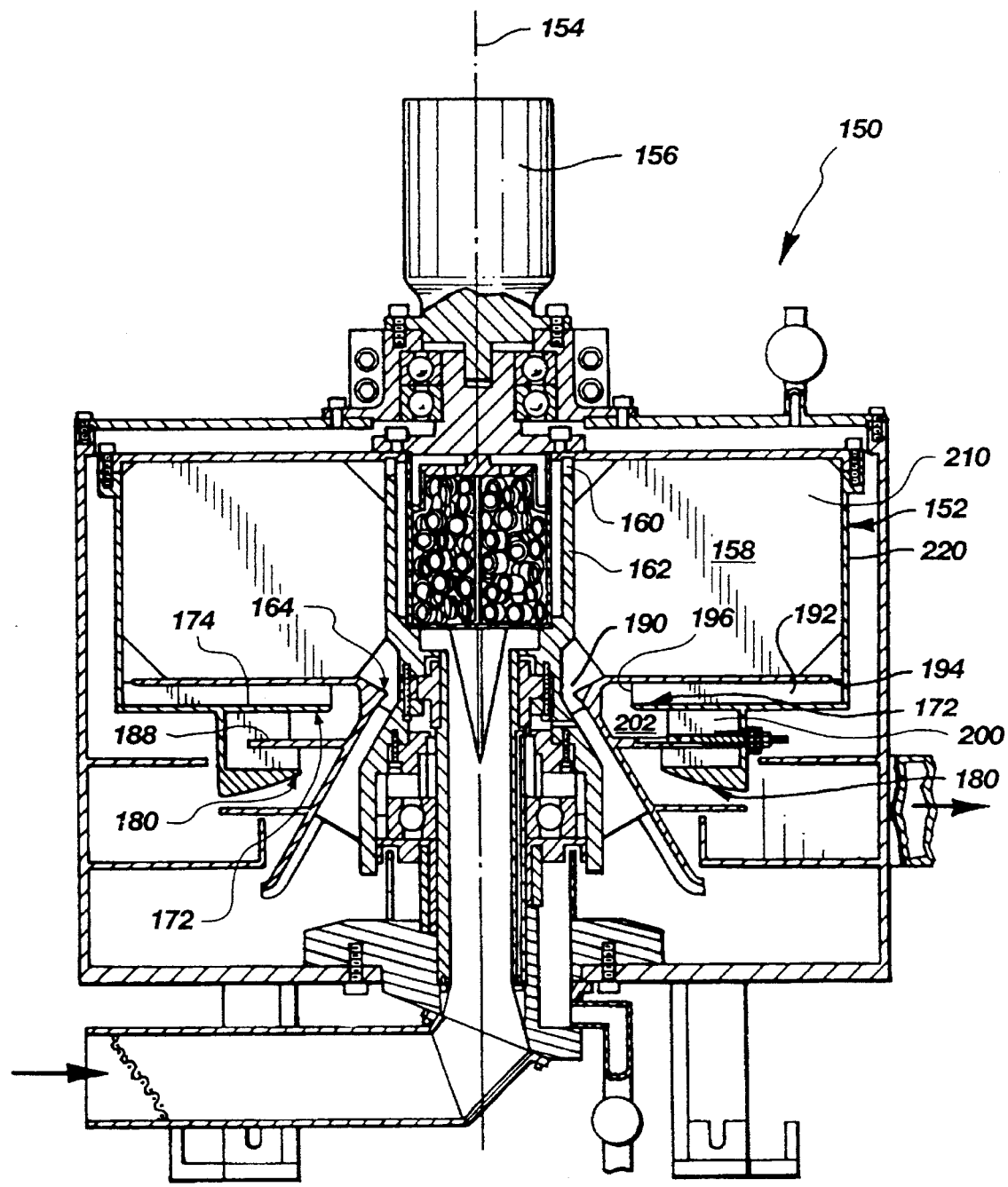
FIG. 7 is a cross-sectional view of another preferred embodiment of a centrifuge in which the teachings of the present invention have been incorporated.

Another preferred embodiment of the invention is illustrated in FIG. 7. A full description of the centrifuge of FIG. 7 is presented in U.S. Pat. No. 5,387,342, filed Nov. 10, 1993 and entitled CENTRIFUGAL SEPARATOR AND METHOD, which disclosure is fully incorporated herein by this reference. The centrifuge of FIG. 7, generally designated at 150, is essentially equivalent in its basic structure to the previously discussed embodiments. However, the rotor in the embodiment of FIG. 7 includes two water weirs.

Figure 8:
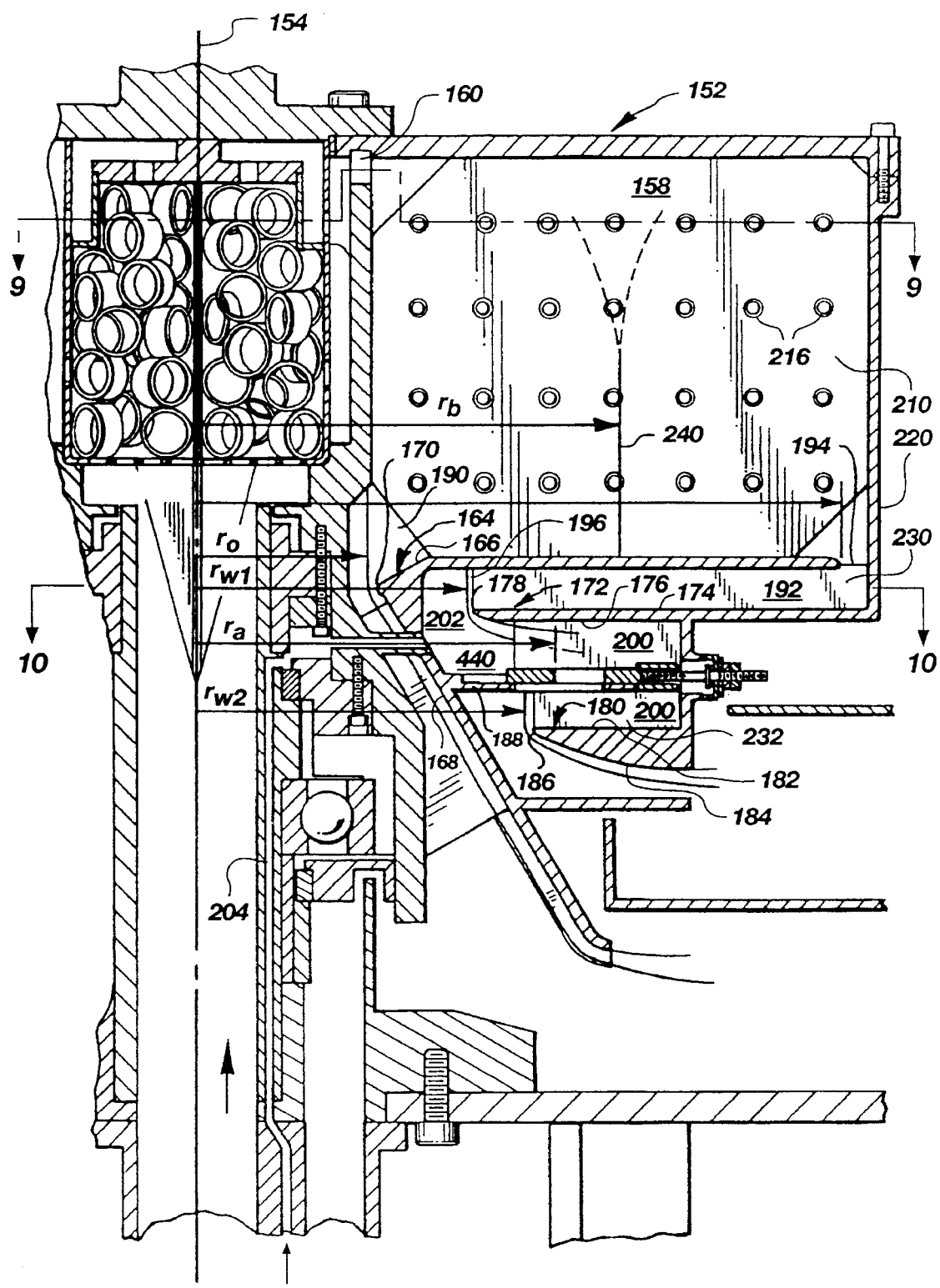
FIG. 8 is a cross-sectional view similar to that of FIG. 7 illustrating the separation chamber and weir structure in operation.

As illustrated in FIGS. 7 and 8, the centrifuge 150 includes a rotor 152 which rotates about a central axis of rotation 154, powered by motor 156. The rotor 152 includes a separation chamber 158, equivalent to the separation chamber 74 of the embodiment of FIG. 2. The separation chamber 158 includes an inlet passageway through which fluids may enter the separation chamber 158. In this embodiment, the inlet passageway includes a plurality of gaps 160 located in the uppermost portion of the hub 162 of the rotor 152.

The rotor 152 is configured with an oil weir 164 which includes a front face 166, a back face 168 and a substantially sharp crest 170 extending annularly about the axis of rotation 154. The rotor also includes a first water weir 172 which likewise includes a front face 174, a back face 176 and a substantially sharp crest 178 which extends annularly about the axis of rotation 154. An exit weir 180 is also configured in rotor 152. The exit weir 180 includes a front face 182, a back face 184 and a substantially sharp crest 186 extending annularly about the axis of rotation 154.

Positioned between the first water weir 172 and the exit weir 180 is an annular plate 188 having an effective length which is adjustable, as fully set forth in the previously identified patent application. Thus, the edge of the annular plate, for purposes discussed herein, corresponds to the effective length of the annular plate.

The rotor 152 is further configured with an oil outlet passageway 190 through which the oil may exit the separation chamber 158. Likewise, a water outlet passageway 192, through which the water may exit the separation chamber 158, is defined between the annular wall which comprises the front face 166 of the oil weir 164 and the front face 174 of the first water weir 172 and extends generally toward the axis of rotation 154.

The water outlet passageway 192 includes an inlet end 194 and an exit end 196. Exit end 196 is at least partially defined by the crest 178 of the first water weir 172.

A fluid pressure chamber 200 is thus defined as the space within the rotor positioned radially outwardly from the crest 178 of the first water weir 172 which receives water as it exits the water outlet passageway 192 by passing over the first water weir 172. One end of the fluid pressure chamber 200 is partially defined by the edge of the annular plate 188 and has a radial position at the effective height of the annular plate 188 while the other end of the fluid pressure chamber 200 is at least partially defined by the crest 186 of the exit weir 180 and has a radial position equal to that of the crest 186 of the exit weir 180. The two ends of the fluid pressure chamber 200 within the rotor are substantially defined by the location of the water surfaces which form at the crest 186 of the exit weir 180 and at the edge (the effective height) of the annular plate 188.

The air space above (i.e., radially inward) the crest 178 of the first water weir 172 and extending towards the fluid pressure chamber 200 to the effective height of the annular plate 188 defines a gas chamber 202. Hence, gas chamber 202 is positioned in fluid communication with the outlet end 196 of the water outlet passageway 192 and extends radially outwardly to the fluid pressure chamber 200. The fluid pressure chamber is in communication with a gas introduction passageway 204 through which gas may be introduced into the gas chamber 202. An external pump (not shown) or other means may provided to supply air or other gas through the gas introduction passageway 204 and into the gas chamber 202.

As with the previously described embodiments of the present invention, the separation chamber 158 includes a plurality of radial plates 210 spaced uniformly within the separation chamber. It is presently preferred that at least a portion of the plates 210 are made of a material having an affinity for one of the fluids to be separated in the separator. In the presently described embodiment which is utilized to separate oil and water, a lipophilic material, such as polypropylene or polyethylene, may be utilized.

Figure 9:
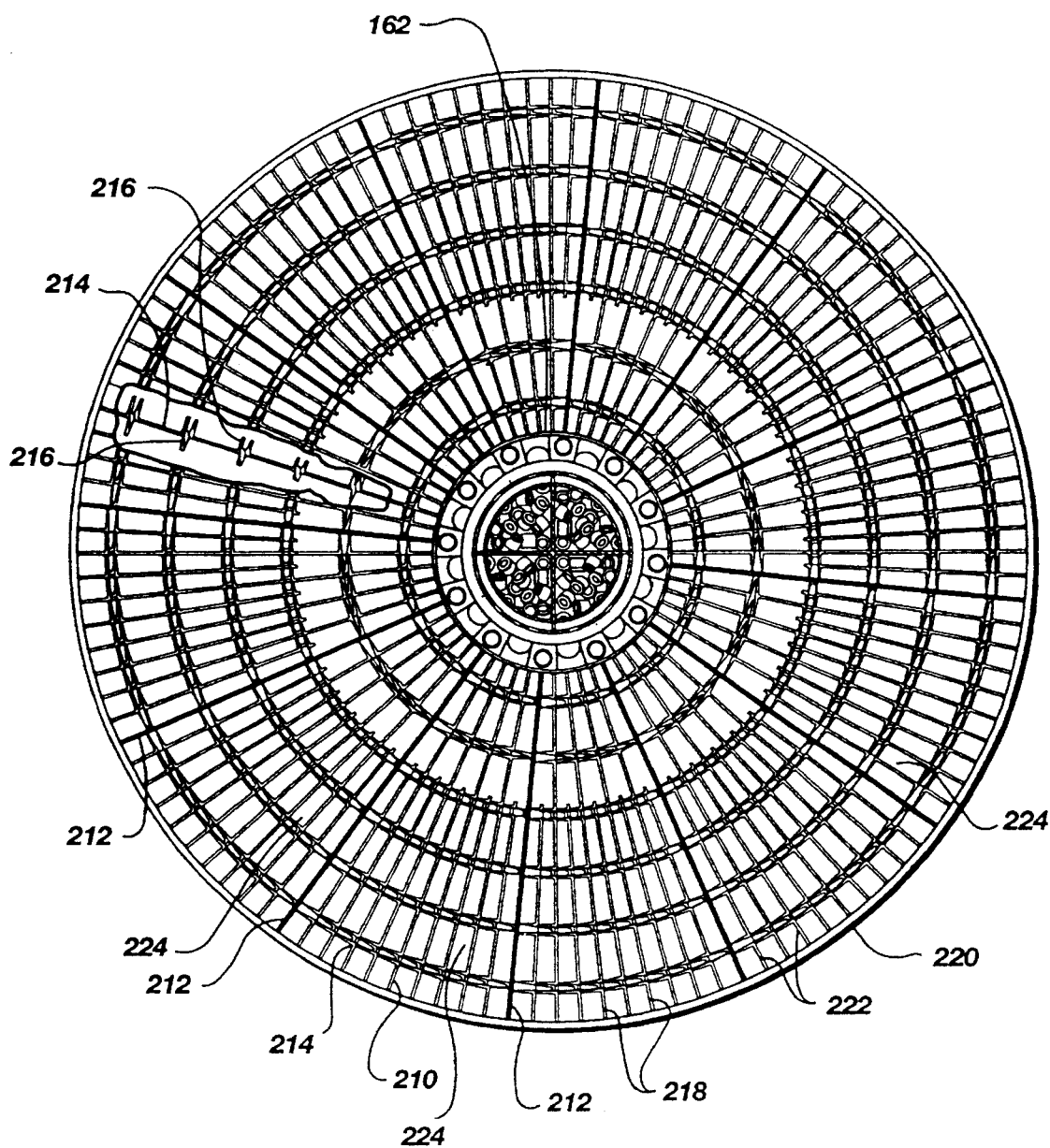
FIG. 9 is a cross-sectional view taken along line 9—9 of FIG. 8.

In this embodiment, the radial plates 210 include twelve stainless steel fins 212 which are welded into the rotor 152 at equally spaced locations, and 108 plastic fins 214, as illustrated in FIG. 9. The plastic fins 214 are positioned into the spaces between metal fins 212 and are configured with spacers 216 which matingly engage corresponding spacers 216 on adjacent fins 214 to maintain uniform spacing between the fins 214. The spacers 216 are generally evenly distributed along the fins 214 in both the radial and longitudinal directions.

In order to keep the distance between plates 210 approximately constant throughout the separation chamber 158, two sizes of fins 214 are utilized. Long fins 218 extend radially from the hub 162 of the rotor 152 to the outer wall 220. At the hub 162, the plates 210 are spaced approximately 9.4 millimeters apart.

At the outer wall 220, short-fins 222 are placed between adjacent long fins 218 such that the distance between fins at the radially innermost portion of the short fins 222 is also approximately 9.4 millimeters.

The radial plates 210 create a series of radial channels 224 within the separation chamber 158 through which fluid may flow. The radial channels 224 thus span the radial and axial extent of the separation chamber, interrupted only minimally by the spacers 216 (whose distribution is best viewed in FIG. 8). It should be appreciated that the fluid flow characteristics within the channels of the separation chamber may be varied as desired for a particular application, for example, to provide turbulent or laminar flow, by appropriate selection of plate spacing or surface texture. In this presently preferred embodiment, the number of plates 210 used (120 plates) is such that the Reynolds number of the flow through the radial channels 224 will be less than the critical Reynolds number, thereby constraining the flow to be laminar.

Figure 10:
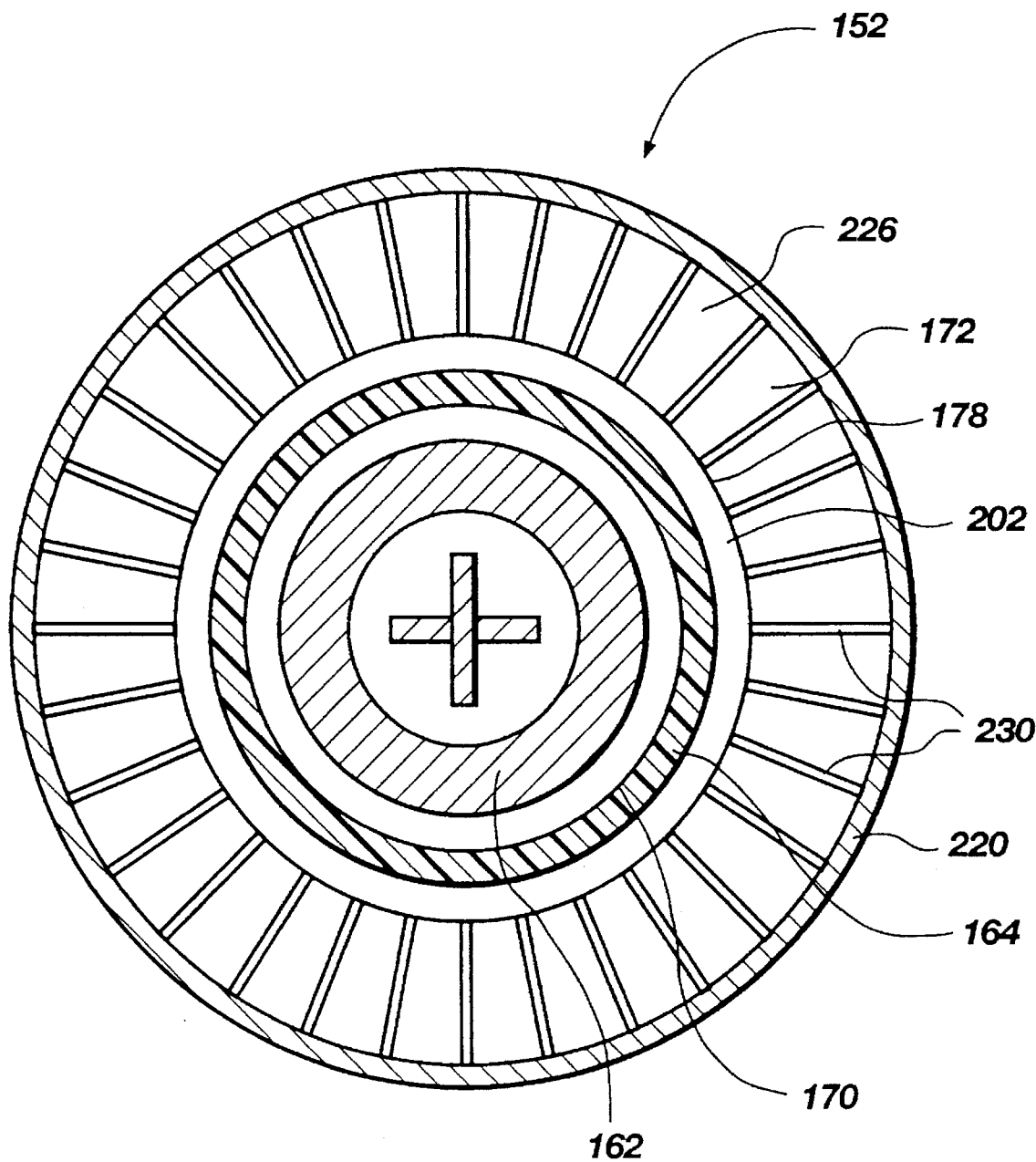
FIG. 10 is a cross-sectional view taken along line 10—10 of FIG. 8.

As illustrated in FIGS. 8 and 10, the water outlet passageway 192 comprises a plurality of channels 226 configured to permit radially inward flow of the water as it passes through the water outlet passageway 192. The channels 226 are formed by configuring the water outlet passageway 192 with a plurality of radial partitions 230. In this preferred embodiment, the partitions 230 extend radially from the inlet end 194 to the outlet end 196 (at the approximate radial position of the crest 178 of the first water weir 172). In this preferred embodiment, at least 18 partitions 230 are employed, with 72 partitions currently being preferred.

In a similar fashion, the fluid pressure chamber 200 includes a plurality of channels configured to permit radial flow of the water through the fluid pressure chamber, as illustrated in FIGS. 7 and 8. The channels within the fluid pressure chamber 200 are defined by a series of partitions 232 which extend radially about the axis of rotation 154 within the fluid pressure chamber 200.

It is presently preferred that the portion of the partitions 232 positioned above the annular plate 188 extend radially inwardly an amount sufficient to ensure that the partitions will extend to the water level above (radially inward) the annular plate 188 regardless of the radial distance at which the effective height of the plate 188 is adjusted. One of skill in the art will appreciate that in embodiments in which a nonadjustable annular plate is employed, the partitions 232 should extend to the radially outward edge of the partition. The partitions 232 preferably extend substantially all the way to the radial position defined by the crest 186 of the exit weir 180.

The pressure balance equation for the embodiment of centrifuge illustrated in FIGS. 7–10, in which two water weirs are employed, is:

$$P_O + \int_{r_O}^{r_b} \rho_O \omega^2 r \, dr = P_{W2} + \int_{r_{W1}}^{r_b} \rho_W \omega^2 r \, dr + \int_{r_{W2}}^{r_a} \rho_W \omega^2 r \, dr \quad (5)$$

where $P_O$ is the gas pressure over the oil weir 164, $P_{W2}$ is the gas pressure over the exit weir 180, $r_O$ is the radial distance from the axis of rotation 154 to the surface of the oil as it approaches the crest 170 of the oil weir 164, $r_b$ is the radial distance from the axis of rotation 154 to the interface 240 within the separation chamber 158, $r_{W1}$ is the radial distance from the axis of rotation 154 to the surface of the water as it approaches the crest 178 of the first water weir 172, $r_{W2}$ is the distance from the axis of rotation 154 to the surface of the water as it approaches the crest 186 of the exit weir 180, $\rho_O$ is the effective density of the oil, $\rho_W$ is the effective density of the water, and $\omega$ is the angular velocity of the water and oil as they pass through the rotor 152.

For the centrifuge illustrated in FIGS. 7–10, $P_O$ and $P_{W2}$ are substantially equal, thereby canceling those parameters from the equation. And, as previously discussed, $\omega$ is held constant for an element of flow through the rotor by the radial plates 210 in the separation chamber 158, the radial partitions 230 in the water outlet passageway 192 and the radial partitions 232 in the fluid pressure chamber 200. By constraining the flow to the channels defined by these plates and partitions, the centrifuge is capable of operating over a wide range of flow rates and with a wide range of fluid compositions, rendering it substantially more versatile and efficient than centrifuges previously known.

It should be appreciated that the apparatus and methods of the present invention are capable of being incorporated in the form of a variety of embodiments, only a few of which have been illustrated and described above. The invention may be embodied in other forms without departing from its spirit or essential characteristics. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A rotor configured for rotation about an axis of rotation for use in a centrifugal separator for separating into its component parts a mixture of a first fluid and a second fluid, the first fluid having a density less than the density of the second fluid, comprising:

a separation chamber;

an inlet passageway through which the fluid mixture may enter the separation chamber;

a first fluid outlet passageway through which the first fluid may exit the separation chamber; and a second fluid outlet passageway through which the second fluid may exit the separation chamber, the second fluid outlet passageway comprising a plurality of channels, each channel extending towards the axis of rotation at a generally constant circumferential position, the channels being at least partially defined by a plurality of radial partitions extending axially and radially within the second fluid outlet passageway, thereby permitting radially inward flow, and preventing circumferential flow, of the second fluid.

2. A rotor as defined in claim 1, wherein the separation chamber comprises a plurality of channels extending axially and radially.

3. A rotor as defined in claim 2, wherein the channels of the separation chamber are at least partially defined by a plurality of radial plates extending axially and radially within the separation chamber.

4. A rotor as defined in claim 1, wherein the second fluid outlet passageway and the separation chamber are symmetrical about the axis of rotation.

5. A rotor as defined in claim 4, wherein the second fluid outlet passageway and the separation chamber each extend substantially annularly about the axis of rotation.

6. A rotor as defined in claim 1, wherein the first fluid outlet passageway is at least partially defined by a first weir having a crest over which the first fluid may pass.

7. A rotor as defined in claim 1, wherein the second fluid outlet passageway includes an exit end which is at least partially defined by a second weir having a crest over which the second fluid may pass.

8. A rotor as defined in claim 1, wherein the second fluid outlet passageway has an inlet end and an exit end and wherein the channels of the second fluid outlet passageway extend substantially the entire distance from the inlet end to the exit end of the second fluid outlet passageway.

9. A rotor as defined in claim 1, wherein the channels of the second fluid outlet passageway are disposed at a substantially constant axial position.

10. A centrifuge for separating into its component parts a mixture of a first fluid and a second fluid through rotation about a central axis of rotation, the first fluid having a density less than the density of the second fluid, comprising:

an inlet duct having a receiving end and a discharge end;

a rotor mounted for rotation about the axis of rotation, the rotor including a separation chamber, an inlet passageway, a first fluid outlet passageway, and a second fluid outlet passageway, the second fluid outlet passageway comprising a plurality of channels, each channel extending towards the axis of rotation at a generally constant circumferential position, the channels being at least partially defined by a plurality of radial partitions extending axially and radially within the second fluid outlet passageway, thereby permitting radially inward flow, and preventing circumferential flow, of the second fluid, the inlet passageway positioned in fluid communication with the discharge end of the inlet duct for receiving the fluid mixture;

a first weir positioned in fluid communication with the first fluid outlet passageway;

a second weir positioned in fluid communication with the second fluid outlet passageway; and rotation means for rotating the rotor about the axis of rotation.

11. A centrifuge as defined in claim 10, wherein the separation chamber comprises a plurality of channels extending axially and radially.

12. A centrifuge as defined in claim 11, wherein the first weir has a front face and a crest extending substantially annularly about the axis of rotation, the front face of the first weir defining a portion of the separation chamber and wherein the separation chamber includes a plurality of radial plates extending axially and radially which at least partially define the channels of the separation chamber.

13. A centrifuge as defined in claim 12, wherein the radial plates extend along substantially all of the front face of the first weir.

14. A centrifuge as defined in claim 11, wherein the second fluid outlet passageway comprises at least 18 channels.

15. A centrifuge as defined in claim 10, the second weir having a front face and a crest extending substantially annularly about the axis of rotation, the second fluid outlet passageway including an exit end which is at least partially defined by the crest of the second weir.

16. A centrifuge as defined in claim 10, wherein the second fluid outlet passageway has an inlet end and an exit end and wherein the channels of the second fluid outlet passageway extend substantially the entire distance from the inlet end to the exit end of the second fluid outlet passageway.

17. A centrifuge as defined in claim 10, wherein the channels of the second fluid outlet passageway are disposed at a substantially constant axial position.

18. A centrifuge for separating into its component parts a mixture of a first fluid and a second fluid through rotation about a central axis of rotation, the first fluid having a density less than the density of the second fluid, comprising:

an inlet duct having a receiving end and a discharge end;

a separation chamber mounted for rotation about the axis of rotation, the separation chamber including an inlet passageway, a first fluid outlet passageway, a plurality of radial plates extending axially and radially, and a second fluid outlet passageway, the second fluid outlet passageway including a plurality of radial partitions extending axially and radially within the second fluid outlet passageway to permit radially inward flow and prevent circumferential flow of the second fluid, the inlet passageway positioned in fluid communication with the discharge end of the inlet duct for receiving the fluid mixture;

a first weir positioned in fluid communication with the first fluid outlet passageway of the separation chamber;

a second weir positioned in fluid communication with the second fluid outlet passageway of the separation chamber; and rotation means for rotating the separation chamber about the axis of rotation.

19. A centrifuge as defined in claim 18, wherein the first weir has a front face and a crest extending substantially annularly about the axis of rotation, the front face of the first weir defining a portion of the separation chamber and wherein the plurality of radial plates extend along substantially all of the front face of the first weir.

20. A centrifuge as defined in claim 19, wherein the plurality of radial plates comprises at least 18 radial plates.

21. A centrifuge as defined in claim 18, the second weir having a front face and a crest extending substantially annularly about the axis of rotation, the second fluid outlet passageway including an exit end which is at least partially defined by the crest of the second weir.

22. A centrifuge as defined in claim 18, wherein the second fluid outlet passageway has an inlet end and an exit end and wherein the radial partitions of the second fluid outlet passageway extend substantially the entire distance from the inlet end to the exit end of the second fluid outlet passageway.

23. A centrifuge for separating a first fluid from a second fluid through rotation about an axis of rotation, the first fluid having a density less than the density of the second fluid, comprising:

an inlet duct having a receiving end and a discharge end;

a separation chamber mounted for rotation about the axis of rotation, the separation chamber including an inlet passageway, a first fluid outlet passageway, and a second fluid outlet passageway, the inlet passageway positioned in fluid communication with the discharge end of the inlet duct for receiving the mixture;

a first weir positioned in fluid communication with the first outlet passageway of the separation chamber, the first weir having a crest over which the first fluid may pass;

the second fluid outlet passageway having an inlet end and an exit end, the inlet end being in fluid communication with the separation chamber at a location radially outward from the crest of the first weir, the second fluid outlet passageway extending generally toward the axis of rotation and comprising a plurality of channels configured to permit radially inward flow and prevent circumferential flow of the second fluid, the exit end of the second fluid outlet passageway at least partially defined by a second weir having a crest over which the second fluid may pass to exit the second fluid outlet passageway;

a fluid pressure chamber positioned radially outwardly from the crest of the second weir to receive the second fluid as it exits the second fluid outlet passageway over the second weir, the fluid pressure chamber partially defined by an exit weir having a crest over which the second fluid may pass to exit the fluid pressure chamber and including a plurality of channels configured to permit radial flow and prevent circumferential flow of the second fluid;

a gas chamber positioned in fluid communication with the exit end of the second fluid outlet passageway and extending radially outwardly to the fluid pressure chamber;

a gas introduction passageway through which gas may be introduced into the gas chamber;

means for introducing a flow of gas into the gas introduction passageway; and rotation means for rotating the separation chamber about the axis of rotation.

24. A centrifuge as defined in claim 23, wherein the separation chamber comprises a plurality of channels extending axially and radially.

25. A centrifuge as defined in claim 24, wherein the channels of the separation chamber are at least partially defined by a plurality of radial plates extending axially and radially within the separation chamber.

26. A centrifuge as defined in claim 23, wherein the channels of the second fluid outlet passageway are at least partially defined by a plurality of radial partitions extending axially and radially within the second fluid outlet passageway.

27. A centrifuge as defined in claim 26, wherein the radial partitions of the second fluid outlet passageway extend substantially the entire distance from the inlet end to the exit end of the second fluid outlet passageway.

28. A centrifuge as defined in claim 23, wherein the channels of the fluid pressure chamber are at least partially defined by a plurality of partitions extending axially and radially within the fluid pressure chamber.

29. A centrifuge as defined in claim 28, further comprising an annular plate having an edge, the annular plate defining a portion of the fluid pressure chamber.

30. A centrifuge as defined in claim 29, wherein the fluid pressure chamber has a first end at least partially defined by the edge of the annular plate and a second end at least partially defined by the crest of the exit weir and wherein the partitions extend from the first end to the second end of the fluid pressure chamber.

\* \* \* \* \*